Jan. 28, 1964     W. H. BLASHFIELD     3,119,555
TAPE TO TICKET ARRANGEMENT FOR AUTOMATIC TOLL TICKETING
Filed Aug. 29, 1961     2 Sheets-Sheet 1
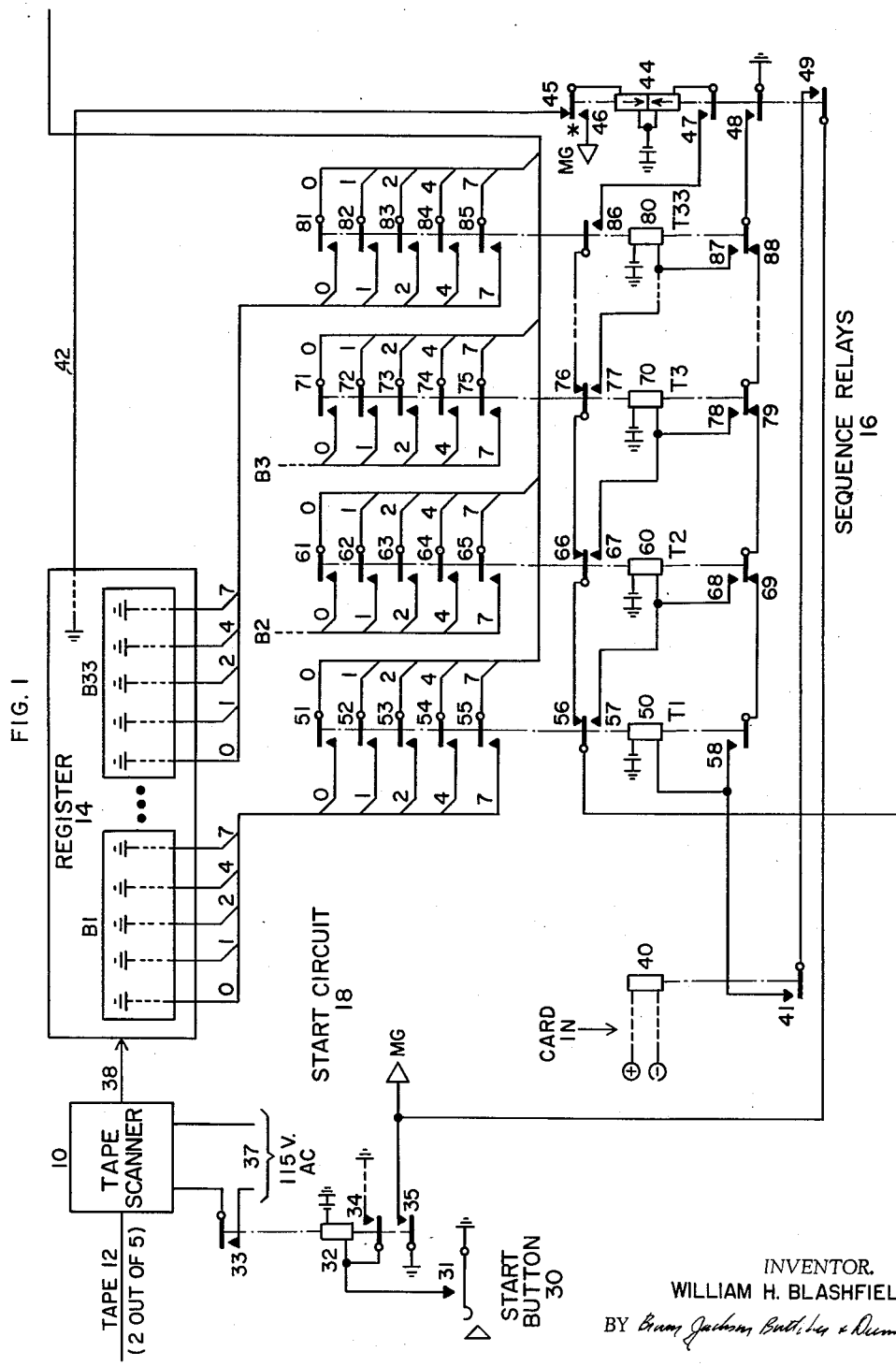
INVENTOR.
WILLIAM H. BLASHFIELD

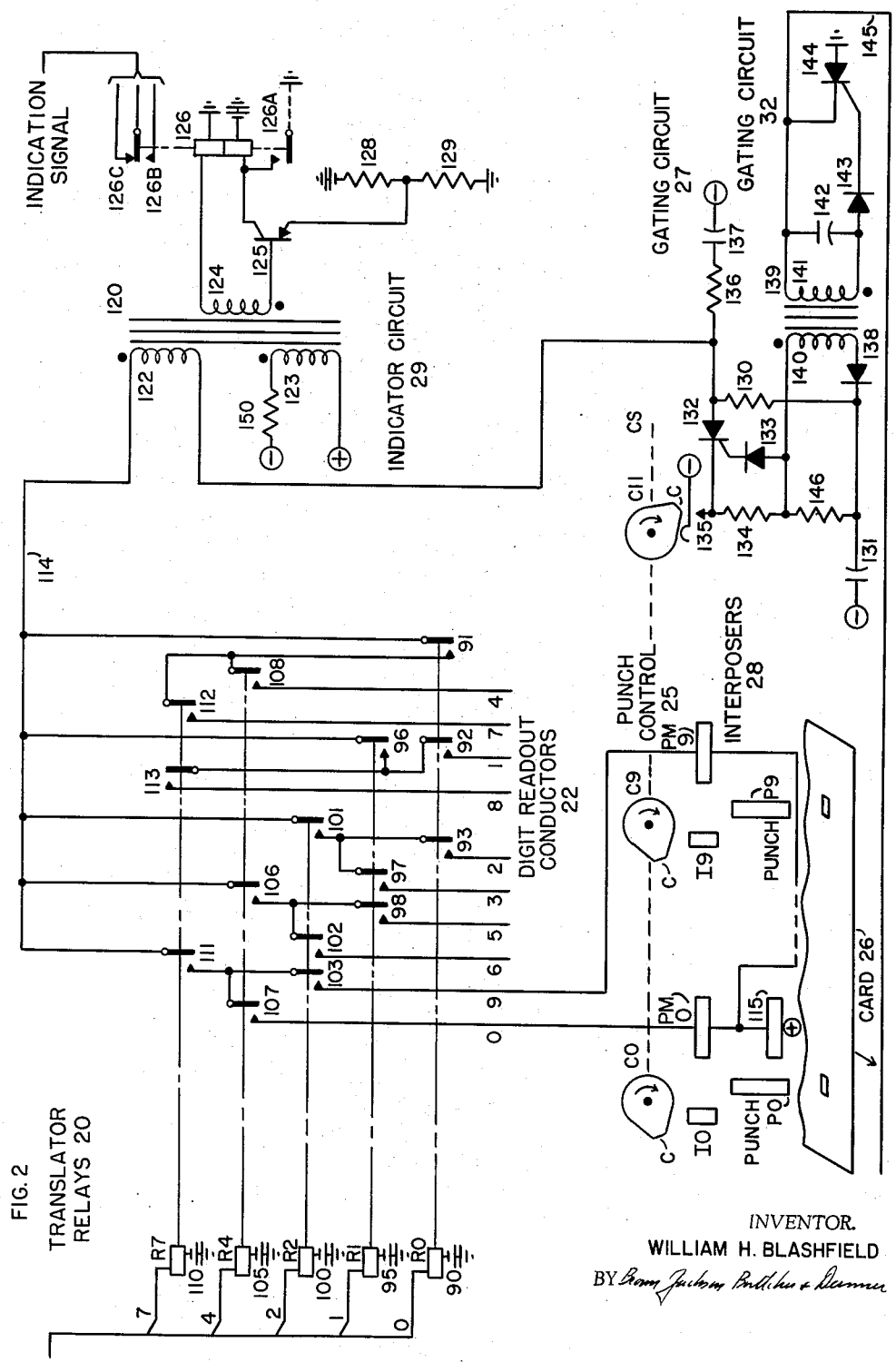

United States Patent Office 3,119,555
Patented Jan. 28, 1964

3,119,555
TAPE TO TICKET ARRANGEMENT FOR
AUTOMATIC TOLL TICKETING
William H. Blashfield, Galion, Ohio, assignor to North
Electric Company, Galion, Ohio, a corporation of
Ohio
Filed Aug. 29, 1961, Ser. No. 134,754
8 Claims. (Cl. 234—30)

The present invention is directed to toll ticketing equipment for use in an automatic telephone system, and specifically to a novel control circuit for converting coded information on a tape to decimal information on a card for use with automatic billing equipment.

With the increasing use and expansion of automatic telephone systems to serve larger areas, and the increased use of direct dialing systems in the extension of calls to remote toll exchanges, a need has developed for an improved toll ticketing system which is operative to provide a record of the essential information for such toll calls, and further, for equipment for providing such information on a record which permits the use thereof in the automatic billing of charges for such type calls. In most instances, the basic information required in the billing of a call includes the calling and called directory number, the rate or charge for the call, and the duration of the call.

In certain well known types of automatic systems it has been determined that the recording of the essential information on a tape in a two-out-of-five code is extremely practical, and is, in many instances, preferred from a cost standpoint. In many smaller exchanges, therefore, the essential information for a call is punched on a tape and bills are prepared on the basis thereof. In other installations an inexpensive analyzer unit may be used in the provision of a record of increased legibility for use in the billing operation. In recent years, moreover, more and more exchanges have been given access to automatic billing equipment which is controlled by cards punched to include the essential information of a call to automatically prepare the necessary bills for forwarding to the customer. In many installations, and particularly in metropolitan installations in which the billing operation is complex and expensive, the use of such equipment is preferred.

As indicated above, in the use of such equipment the essential information must be punched in a digital code in a predetermined pattern on a card of the type which is particularly adapted for use with the automatic billing equipment. Since, for reasons of economy in many exchanges, the information is first recorded on a tape member in a two-out-of-five code, the information which is thus initially recorded must be converted to a digital code and punched on a card, and it is a particular object of the present invention to provide a new and novel control system for providing punched cards containing such information from a punched tape record.

According to the invention, the information contained on the tape is scanned and transmitted to a multi-bin register for storage therein, each digit of the information being stored on a different, preassigned bin in the register. A group of sequence relays is operative to successively transfer the digits stored on the different bins to translator means, which are operative to translate the digits from the two-out-of-five code to the digital code. In the novel arrangement, it was found that the sequence relays frequently can transfer the information to the translator means (and the translator means and associated equipment can provide a punched record on a card) at a rate faster than the rate of transmission of the information to the register bins by the tape scanning means.

It is apparent that if the sequence means and translator means advance ahead of the information recorded on the bins, any information provided on the resultant card will be inaccurate. It is a further object of the invention, therefore, to provide a novel arrangement which includes means for providing a delayed start of the sequence means relative to the transmission of the tape information to the register by the scanning means, and which further includes means for halting advancement of the sequencing means whenever the sequence means have advanced to the bin in which the tape information is being recorded.

It is a further object of the invention to provide a novel gating circuit for advancing the sequence means, and additionally a novel arrangement for controlling operation of the sequence means in timed relation with the registration of the tape information on the register.

It is yet another object of the invention to provide a new and novel indicator circuit for detecting the operation of more than a predetermined number of relay members in any operation, and particularly a novel current detector which is more reliable and efficient in the detection of predetermined current conditions.

These and other advantages of the present invention will become apparent with reference to the following specification and accompanying drawings wherein basic embodiments of the structure are illustrated, and in which:

FIGURES 1 and 2 are a schematic circuit diagram of the novel control system for converting taped information in a two-out-of-five code to information on a punched card in the digital code.

*General Description*

The novel system for controlling the preparation of a card for use with commercial billing equipment from a punched tape having information placed thereon in a two-out-of-five code is set forth in FIGURES 1 and 2 of the drawings. Although the novel control system is adaptable for operation with different types of equipment, the circuit is described in its manner of connection and operation with a card punch machine of the type which is commercially available as Model No. 024 or No. 026 from the International Business Machines Company, Endicott, New York.

With reference to FIGURES 1 and 2, the system basically comprises a tape scanner 10 which is operative as energized to scan the information on tape 12 and to provide electrical signals over an output circuit 38 which are representative of the digital information stored on the tape. The output circuit 38 is connected to a register 14 which includes a plurality of bins B1–B33 for storing the information which is transmitted thereto by the tape scanner. The number of storage bins in register 14 will vary with the amount and nature of information to be stored. In one commerical embodiment, the register 14 included thirty-three bins, which are represented herein as bins B1–B33, each of which is connected to store one digit of the information pertaining to a call. Each bin includes a group of five relays which are operative in different combinations to represent digits of different values. Each relay includes a plurality of contacts, and the contacts of the relays in each bin are interconnected to mark a set of five conductors in a two-out-of-five code to indicate the information stored thereby. With reference to FIGURE 1, the conductors 0, 1, 2, 4, 7 connected to bin B1 are exemplary of the five marking conductors which constitute the output marking conductors for each of the different bins.

As the first scanner digit is transmitted over conductor 38 to the register 14, the information is routed to the relays of bin B1 which operate to mark the value of the digit on the marking conductors 0, 1, 2, 4, 7 in the two-out-of-five code. Assuming the first scanned digit has a value of "six," the relays in bin B1 will operate to connect ground to marking conductors 2 and 4. As the second digit is received by register 14, the relays of the second bin B2 are energized to connect marking ground to the marking conductors for bin B2 to indicate the value of the second received digit thereon in the two-out-of-five code. As the scanning operation continues, the successive digits scanned are registered on successive ones of the bins B1–B33 in register 14. Registers, such as illustrated register 14, are well known in the art, and the foregoing description thereof is believed sufficient for the purpose of the present disclosure.

A start circuit 18 is connected to control energization of the control circuit including the tape scanner 10, and basically comprises a start button 30 having contacts 31 connected to energize a start relay 32. Start relay 32 at its contacts 33 controls energization of the tape scanner 10 from a conventional 115 volt source 37, and at its contacts 34 completes a self-holding circuit (which may extend over other control contacts in the system) and at its contacts 35 controls energization of a group of sequence relays 16 which are operative to "readout" or transfer the information stored on the bins B1–B33 in a predetermined sequence to a translator relay group 20.

Sequence relay group 16, which operates in the manner of a counting chain, includes a plurality of relays T1–T33, the number of relays being the same as the number of bins B1–B33, each of which relays has a set of "readout" contacts, such as 51–55 on sequence relay T1, which control the transfer of the information stored on an interconnected one of the bins to translator relay group 20, and a set of contacts 56–58 which are operative in controlling advancement of the sequence relay group. A pickup relay 44 is connected over conductor 42 to the register 14 and in its initial operation is effective at contacts 49 to start the readout of the bins B1–B33, at its make-before-break contact set 45–46 completes a self-holding circuit and opens its original energizing circuit, and at its contacts 48 controls a holding circuit for relay group 16, and at its contacts 47 prepares a release circuit for its lower winding.

The translation relay group 20 includes five translation relays 90–110 (R0, R1, R2, R4, R7) having a translation contact set 91–113 connected to translate digits in the two-out-of-five code to the digital code. The windings of relays R0–R7 are connected to the "readout" contacts of each of the sequence relays, such as contacts 51–55 on sequence relay T1, and as a sequence relay, such as relay T1, operates to connect the five marking conductors for its associated bin, such as bin B1, to the relays R0–R7 the ones of the translation relays R0–R7 connected to the two marked conductors are operated.

The translator contacts 91–113 are connected over a set of digit readout conductors 0–9 to a punch control circuit 25, and over a common conductor 114 to an indicator circuit 29 and a gating circuit 27. As shown in FIGURE 2, a pair of translator contacts are connected to each readout conductor, each pair of contacts thus connected being operated by the pair of relays which represent a total value which corresponds to the value represented by the digit conductor. Thus contacts 103, 111 on relays R2, R7 are connected to digit readout conductor 9, contacts 102, 106 on relays R2, R6 are connected to digit readout conductor 6, etc. The only exception is the connection of contacts 107, 111 on relays R4, R7 to digit readout conductor zero.

Punch control circuit 25 includes a rotating cam shaft CS, and a plurality of cam members C0–C11 mounted on the cam shaft, each of which has a camming surface C. With energization of the punch machine, the shaft CS and cams C0–C11 is assumed to rotate continuously. Each cam, such as C0, is located in spaced relation with a punch member, such as P0, and an interposer, such as I0, is mounted for movement into the space between the punch P0 and the cam surface C on cam C0. Movement of the interposer into such position is controlled by an associated interposer coil PM0, which is, in turn, connected to the "0" digit readout conductor of the translator relays 20. With energization of the interposer coil PM to move the interposer I0 in aligned relation with punch P0 as a result of the receipt of the digit "0" by translation relays 20 (and a further control signal described more fully hereinafter), the movement of the camming surface on cam C0 into contact with interposer I0 will depress punch P0 downwardly. A card 26 located beneath the aligned punches P0–P9 is then punched to indicate receipt of the digit "0."

According to a feature of the invention, the punching of the card 26 to include the information obtained from the bins B1–B33 is carefully gated relative to the information input to register 14, such control being provided by a novel gating circuit 27.

As shown in FIGURE 2, the input circuit for gating circuit 27 is connected over the primary winding 122 of transformer 120, conductor 114 and the translator contacts to the digit readout conductors 0–9, interposer coils PM0–PM9 and relay 115 to the positive potential. Resistor 130 in gating circuit 27 is connected to the input circuit to provide a charging circuit for capacitor 131, the time of capacitor charge over such circuit being in the order of 10 ms. Such charging circuit is used as the system is initially energized, and as shown hereinafter, a different charging circuit is used in subsequent operations of the gating circuit 27.

A cam C11 on rotating cam shaft CS periodically and cyclically completes a discharge circuit for capacitor 131 which includes contacts 135, resistances 146, rectifier 133 and the control path of rectifier 132, the capacitor discharge over such circuit being approximately ¼ ms. The the main path of silicon controlled rectifier 132 which is connected between the input circuit and contacts 135 is normally open to prevent operation of the interposer coils connected in the input circuit for the gating circuit 27. During the period of discharge of the capacitor 131, the main path of rectifier 132 is conductive, and any interposer coil connected in circuit therewith is operated.

Since camming surface of cam C11 closes contacts 135 in advance of the movement of camming surfaces of cams C0–C9 into operative position, the selected ones of the interposers will always be properly positioned for each punching operation.

The second charging path for capacitor 131 in gating circuit 27 includes rectifier 132, resistor 134, the primary winding 140 of transformer 139 and rectifier 138, the second charging circuit being completed with the opening of contacts 135 during the period the main path of rectifier 132 is conductive, the charging time over such circuit being in the order of ½ ms. The secondary winding 141 of transformer 139 is connected in signal circuit which controls the gating or advancement of the sequence relays 16. A capacitor 142 is connected across secondary winding 141, and a rectifier 143 is connected in the control path for a silicon controlled rectifier 144 which has its output circuit connected over a chain advancing conductor 145 to the sequence relay group 16. As shown hereinafter, a gating signal will be coupled to the sequence relay group 16 only if information was present in the translator relays at the time of closure of contacts 135 so that rectifier 132 was turned on, resulting in an interposer operating, or stated in another manner, only if the sequence relays have not moved ahead of the tape in readout of the information stored on the bins.

Indicator circuit 29 comprises a novel warning or control circuit for providing an indication or control operation whenever three or more of the translator relays R0–R7 operate at the same time. As shown, the circuit includes transformer 120 having a first primary winding 122 connected in the input circuit for the gating circuit 27 and a second primary winding 123 which is connected over resistor 150 to a bias source of potential. The secondary winding 124 of transformer 120 is connected over the upper winding of a two-winding relay 126 to ground, and also to the base circuit of transistor 125, which may be of the type commercially available as a 2N398. The emitter of transistor 125 is connected over a voltage divider including resistors 128 and 129, and the collector is connected over the lower winding of relay 126 to a source of negative potential. Contacts 126b, c, on relay 126 are connected to control indication or control circuits.

*Operation*

Operation of the system is initiated by placing a card in the machine in a position to close feeler contacts (not shown) which operate relay 40 (FIGURE 1) to close contacts 41 and prepare a point in the energizing circuit for the sequence relays 16. Start button 30 is depressed to effect the energization of start relay 32, which operates and at its contacts 33 completes an energizing circuit from a conventional 115 volt D.C. source 37 to the tape scanner 10, which operates to advance and scan the digital information recorded on tape 12, and to transmit the information as detected in the scan over output conductor 38 to successive ones of the bins B1–B33 in register 14 for registration thereon in the two-out-of-five code, successive bins being used to register successive digits.

Start relay 32 at its contacts 34 completes a self-holding circuit, and at its contacts 35 connects ground to the master ground lead for the system, and prepares a further point in the energizing circuit for the sequence relays 16. As the scanned information is coupled to the successive bins B1–B33, the bin relays effect marking of their associated marking conductors (identified as 0, 1, 2, 4 and 5) in a two-out-of-five code to represent the digits stored thereon. Digit 1, for example, is represented by marking the conductors identified as 0 and 1 with ground; digit 2 is represented by marking conductors 0 and 2 with ground; digit 3 is represented by marking the conductors identified as 1 and 2 with ground, etc. Registration of the information on the bins B1–B33 in register 14 continues for the period of energization of the tape scanner 10.

Control conductor 42 which effects initial operation of the pickup relay 44 in sequence relay group 16 is strapped to a preselected one of the bins B1–B33, and as the strapped bin is reached in the storage of the taped information on the bins, the bin couples a start signal over conductor 42 to the pickup relay 44 to operate same and thereby initiate readout of the information on the bins B1–B33 by the sequence relay group 16.

As indicated above, the sequence relay group 16 includes a plurality of relays T1–T33 which is equal in number to the number of bins B1–B33. As now shown, the first sequence relay T1 is energized by pickup relay 44, and the relays are operated in sequence in the manner of a counting chain in response to the receipt of each successive gating signal from gating circuit 27. Each sequence relay, such as T1, is effective, as operated to connect the information stored on its associated bin, such as bin B1, to the translator relays 20.

More specifically, as pickup relay 44 now operates, it is effective at its make before break contact sets 45, 46 to complete a self-holding circuit for the upper winding which extends to the master ground conductor MG for the system (contacts 35 on the start relay 32 to ground), and interrupts the energizing circuit completed thereto by the register 14; at its contacts 47 prepares an operating circuit for its lower or release winding, and at its contacts 48 prepares a holding circuit for the relays T1–T33 in the sequence relay group 16, and at its contacts 49 completes the energizing circuit for the first sequence relay 50, the circuit extending from battery over the winding of relay 50, contacts 41, 49 and 35 to ground.

Assuming that digit "9" is stored on bin B1, ground will be connected to marking conductors 2 and 7, and with the operation of the first sequence relay 50, ground will be connected over contacts 53, 55 to relays 110 (R7) and 100 (R2) to effect the operation thereof. Sequence relay T1 in its operation is also effective at its contacts 57 to prepare an operating circuit for the second relay T2 in the sequence; and at its contacts 58 completes a self-holding circuit which extends from battery over the winding of sequence relay T1, contacts 58, 69, 79, the corresponding contacts of each of the successive relays T4–T32 in the sequence, and contacts 88 and 48 to ground.

Translator relays 100, 110 (R2, R7) operate and at their contacts 103, 111 translate the number "9" as received in the two-out-of-five code to the decimal code by connecting the digit readout conductor 9 to the input conductor 114 for the gating circuit 27, the circuit extending from positive potential over relay 115, interposer coil PM9, digit readout conductor 9, contacts 103 and 111, conductor 114, the primary winding 122 of transformer 120 in the indicator circuit 29, and resistor 130 and capacitor 131 to negative potential. The capacitor 131 charges over such circuit in approximately 10 ms., but the relay 115 and interposer coil PM9 do not operate.

As noted above, control shaft CS, which carries cams C0–C11 is continually rotating. Assuming initially that at this time the cam shaft CS moves the camming surface C on cam member C11 into camming engagement with contacts 135 to close the same, a discharge circuit is completed for capacitor 131 which extends over resistor 146, rectifier 133, and the control path for silicon controlled rectifier 132 and contacts 135 to negative. With the flow of current over the control path, the main path of silicon controlled rectifier 132 conducts.

With conduction of the main path of silicon controlled rectifier 132, an operating circuit is completed for the one of the interposer coils PM0–PM9 which is connected to the digit readout conductor which was connected to the input conductor 114 by the translator relays 20 (PM9 in the present example), the circuit extending from positive potential over relay 115, interposer coil PM9, contacts 103, 111, conductor 114, the primary winding 122 of transformer 120, the main path of rectifier 132 and contacts 135 to negative potential. The interposer coil PM9 operates to attract the interposer 19 adjacent thereto and associated latch means (not shown) mechanically latch the interposer 19 in such position.

As the cam shaft CS continues to rotate, and the camming surface C on cam member C11 is moved out of engagement with contacts 135 to permit the opening thereof, a charging circuit is completed for capacitor 131 which extends from positive potential over relay 115, interposer coil PM9, contacts 103, 111, conductor 114, primary winding 122, the main path of silicon controlled rectifier 132, resistor 134, the primary winding 140 of transformer 139, rectifier 138 and capacitor 131 to negative potential. Capacitor 131 charges over such circuit in approximately ½ millisecond, and as the capacitor 131 is charged, the current flow over rectifier 132 is terminated and silicon controlled rectifier 132 returns to the non-conductive condition.

During the period of charging of capacitor 131, the flow of current over the primary winding 140 of transformer 139, induces a signal pulse in the secondary winding 141 of transformer 139 to effect conduction of rectifier 143 which in turn initiates conduction of silicon controlled rectifier 144 to provide an energizing signal over chain advancing conductor 145 to the second sequence relay 60 (T2) of the sequence relay group 16. Sequence relay 60 (T2) operates, and at its contacts 61–65 extends the marking conductors for its associated bin B2 in register 14 to the translator relays 20, and at its contacts 66 opens a further point in the release circuit for pickup relay 44, at its contacts 67 prepares an operating circuit for the third relay 70 (T3) in the sequence, at its contacts 69 interrupts the holding circuit for the first sequence relay 50 (T1), and at its contacts 68 completes a self-holding circuit which extends over contacts 79, the corresponding contacts of the sequence relays T4–T33 and contacts 48 to ground, and also terminates the generation of the chain gating signal on conductor 145. That is, as contacts 68 close, sequence relay T1 is still operated and ground is connected to the gating circuit 32 to terminate the gating signal applied to the sequence relay group 16 by turning off silicon controlled rectifier 144, the ground circuit extending from ground over contacts 48, 88, the corresponding contacts of each of the relays T32–T4 in the sequence, contacts 79, 68, and 57, conductor 145, the main path of silicon controlled rectifier 144 to ground.

The first sequence relay 50 (T1) releases, and the interposer I9 which was operated into aligned relation with punch P9 (during and as a result of the signal readout by the first sequence relay T1) is held mechanically latched in such position. At this time, a second sequence relay T2 has operated and the translator relays 20 have been operated in accordance with the information which is registered on bin B2 to close the ones of contacts 91–113 which represent the stored number in the digital code. Assuming, for example, that the digit stored in the second bin B2 is digit 6, relays 100 and 105 (R2, R4) will be in the operated position, and contacts 102, and 106 are closed to connect the interposer coil PM6 (not shown but assumed) over the input conductor 114 to the gating circuit 27. Since capacitor 131 was previously charged and the main path of rectifier 132 is no longer conductive, no operation occurs at this time.

As the cam shaft CS continues to rotate at the 50 ms. rate, the cam surface C on the cam C9 engages interposer I9 to operate the punch P9 in the punching of the card 26 and the registration of digit 9 thereon. Subsequent to the punch operation, the mechanical latch for the interposer I9 is released.

As the caming shaft CS rotates further, cam C11 advances to the position in which associated camming surface closes contacts 135, capacitor 131 is discharged in the manner above described, and silicon-controlled rectifier 132 conducts to operate the interposer coil PM6 which has been prepared for operation by the translator relays 100, 102 (R2, R6). Interposer coil PM6 attracts its associated interposer I6 (not shown but assumed) which latches mechanically. As the cam shaft CS continues to rotate, and control cam C11 opens contacts 135, capacitor 131 charges, control rectifier 144 conducts to effect advancement of the sequence relays 16 one more step (T3 now operates), and rectifiers 132 and 144 are turned off.

The circuit continues to cycle in such manner until each of the bins B1–B33 in the register 14 have been connected to the translator relays 20, and the translated information has been punched on the card 26 by the punch member. With the operation of cam C11 after the final punch has been made, the control pulse which is transmitted by rectifier 144 over conductor 145 is extended over contacts 56, 66, 76 and the corresponding contacts of relays T4–T32, contacts 86 and 47 to the lower winding of the pickup relay 44 which, being connected in opposition to the upper winding of relay 44, effects the restoration of relay 44.

As pickup relay 44 restores, contacts 45 connect the upper winding of relay 44 to start conductor 42, the register circuit thereto having been since interrupted by the register 14. Relay 44 at its contcts 48 interrupts the holding circuit for the last sequence relay T33, which restores, and at its contacts 81–85 interrupts the circuit for readout current to the ones of the translator relays 20 which were energized thereby. At this time the automatic equipment effects the ejection of the card, and a new card is advanced into position for punching by the punch members to reoperate relay 40 preparatory to the initiation of a new card punching operation.

*Protective Circuits*

It is apparent that in the operation of the circuitry in such manner it is possible that the sequence relays 16 may advance in the readout of the bins at a rate which is faster than the rate the information is being recorded on the bins by the tape scanner 10. In such event, if the sequence relay 16 were allowed to proceed in the connection of the successive bins to the translator relays 20, it is apparent that the desired information would either not be placed on the card 26, or alternatively would be punched at the wrong position on the card. Novel protective means in the circuit prevent such occurrence.

Assuming, for example, that the fiifteenth sequence relay T15 (not shown) operates and that the tape scanner 10 has not yet advanced to the bin B15, in such event, the sequence relays are considered to be "ahead" of the tape scanner 10.

As the cam shaft CS rotates to the position in which the camming surface of cam C11 closes contacts 135, the capacitor 131 discharges in the manner described above to operate rectifier 132 and attempts to complete an operating circuit for the interposer coils. However, as noted above, since the sequence or counting chain 16 has advanced ahead of the tape scanner 10, bin B15 is empty and none of the translator relays 20 will be operated. As a result, the contacts 91–113 on the translator relays are open, and the circuits for the interposer coils PM–PM9 are interrupted. Further, as the cam shaft CS continues to rotate and cam C11 opens contacts 135, the capacitor 131 cannot charge by reason of the open condition of the contacts 91–113 on translator relays 20. Accordingly, the cam shaft CS continues to rotate and cam C11 opens and closes contacts 135 once each revolution without effect.

Such manner of operation continues until such time as tape scanner 10 couples information to the bin associated with the last operated sequence relay (B15 in the present example), and the information thus provided on the bin B15 is transferred by sequence relay T15 to the translator relays 20 to effect the operation thereof and the marking of the digit readout conductor which represents the digit registered on bin B15. With the marking of the proper one of the digit readout conductors in such manner, a circuit is completed which effects the charging of capacitor 131. With the next revolution of the cam C11 and the closure of contacts 135 thereby, the capacitor 131 is discharged, silicon controlled rectifier 132 is rendered conductive, and the selected interposer coil operates so that with continued rotation of the shaft CS, the associated punch will be operated to punch such information on the card 26.

In a commercial machine of the type noted above, the rotating cam shaft CS and control cam C11 are built so that the interposer I0–I9 will operate only at that time in the shaft rotation at which the punch cams, such as C0–C9, are not trying to operate the associated punches P0–P9. Such arrangement presupposes that when cam C11 operates, two relays of the translator relays 20 have been previously operated to prepare circuits for the interposer coils PM0–PM9. In the present arrangement the relays of the translator group 20 may operate at any time including the dwell time of the camming surface on cam C11, and the circuit arrangement is such that the interposer will be energized only if relays of the translator group 20 operate before or during the first part of the dwell time of the camming surface on cam C11. In the present arrangement, the dwell time is in the order of 10 ms.

Failing such arrangement the interposer coils PM0–PM9 might not be operated and the interposers I0–I9 might not be pulled, but the sequence relays 16 would nevertheless be stepped. The novel circuit guards against such possibility by discharging the capacitor 131 during a very small portion of the initial dwell time of the camming surface of cam C11 (in approximately ¼ ms.) to operate the rectifier 132 to the conducting condition for this brief period. If, after the discharge of capacitor 131, none of the relays in the translator group 20 have operated, there will be no sustaining current flow over the rectifier 132, and accordingly the rectifier 132 will be turned off. With capacitor 131 discharged, and the cam surface of cam C11 still maintaining contacts 135 closed, the rectifier 132 remains in the non-conducting position even though relays of the translator group 20 may now operate. If any of the translator relays operate, after the initial gating of rectifier 132 the interposers will not operate until the next revolution of the cam shaft CS and the consequent closing of contacts 135.

When the scanning of tape 12 has been completed or if it is desired to terminate the punching operation, the holding circuit for start relay 32 which extends over contacts 34 is interrupted by appropriate switch means represented by the dotted lines in the holding circuit. Start relay 32 restores and at contacts 33 interrupts the energizing circuit for the tape scanner 10, and at contacts 35 interrupts the holding circuit for the pickup relay 44. Pickup relay 44 restores and at its contacts 48, 49 restores the operated relays in the sequence relay group 16.

It is noted that the translator relays 20 by reason of the connection of the contacts 91–113 for converting signals in the two-out-of-five code to the decimal code include a self-protecting arrangement which prevents operation of the punch member whenever only one of the translator relays is operated. That is, each translator circuit includes two contacts, and if only one relay operates, the interposer circuit will not be completed. In such event capacitor 131 discharges, and cannot charge until such time as a second one of the translator relays is operated.

As noted above, if more than two of the translator relays 20 operate at the same time, the indication circuit 29 operates to complete an indication or control circuit indicating the occurrence of such condition. Such circuit may include a warning light (not shown), a stop circuit for the equipment, or any other suitable control means.

With reference to transformer 120, it is noted that the core of such transformer is of a square hysteresis loop material. The second primary winding 123 for the transformer 120 is connected over resistor 150 to a source of biasing potential. If more than two of the translator relays 20 are operated at the same time as the contacts 135 are closed, the positive potential extended over the relay 115 (600 ohms) and two or more punch magnet coils PM0–PM9 (800 ohms each) will provide a current through winding 122 of sufficient magnitude to overcome the bias provided by the primary winding 123 on transformer 120 and to effect switching of the square loop material. Then where contacts 135 subsequently open, the core switches back to its original magnetic state.

At such time, a negative pulse appears in the secondary winding 124 and is coupled to the base element of transistor 125 to cause the transistor 125 to start to conduct. As the transistor 125 conducts, emitter-collector current flows over the lower winding of relay 126. Voltage induced from the lower to the upper winding of relay 126 maintains the transistor conduction long enough to insure operation of relay 126. Relay 126 operates and at its contacts 126a completes a self-holding circuit, at its contacts 126b completes the indication or control circuit, and at its contacts 126c interrupts a control or indication circuit. The holding circuit of indication relay 126 may be connected over associated control switches which effect the release of relay 126 after each punching operation, or after each card has been completed, or after each tape operation or in any other manner best suited to a particular installation.

Such manner of detecting the operation of three or more translator relays is extremely practical and reliable. One alternative, for example, which would consist of providing additional contacts on the translator relays 20 to detect the operation of more than two relays of the group would require relays having too many contacts which would in turn increase the operating time of the relays. An alternative method which might comprise the use of a current sensitive relay in series with the rectifier 132 would make the punch magnets PM0–PM9 somewhat sluggish, and would require a marginal relay, which in most instances, is undesirable.

By way of comparison, the impedance of the primary winding 122 of transformer 120 is very low, and the resultant circuit is fast and sensitive. If desired, the polarity of secondary winding 124 may be changed to effect the operation of relay 126 responsive to closure of contacts 135 rather than with the opening thereof.

While cams C0–C9 were shown as separate cams for simplicity of illustration, actually these cams constitute an integral bail mechanism. It should be understood also that the interposers are shown in a simplified manner for illustration.

While only a particular embodiment of the invention has been disclosed and claimed, it is apparent that modifications and alterations may be made therein, and it is intended that the appended claims cover all such modifications and alterations as may fall within the true spirit and scope of the invention.

What is claimed is:

1. In a control circuit for controlling conversion of information recorded on tape in a first code to information in a second code for representation by punches on a card, register means connected to store different sets of signals received from said tape, translator means including a plurality of translator devices for converting signals from the first code to information in the second code, punch control means for controlling punching of the translated information on a card, sequence means operative to transfer each set of the signal information stored on said register means to said translator means in a predetermined sequence, gating means including switching means operative to prepare said punch control means for operation in the punching of the card to include each set of the information only in response to translation of a set by said translator means, control means operative only in response to said preparation of said punch control means by said switching means to transmit a control signal to operate said sequence means to transfer a successive set of information from said register means to said translator means, and means in said sequence means operative to terminate transmission of said control signal by said control means.

2. An arrangement as set forth in claim 1 which includes means connected to said translator means and said gating means operative to detect the operation at any one time of more than two of said translator devices in said translator means, and means controlled by said detection means for providing a control signal indicative of such condition.

3. For use in a control circuit for controlling conversion of information from a first code to a second code, having register means connected to store different sets of information in said first code, translator means including a set of translator devices for converting information in the first code to information in the second code, punch control means including digit representative circuits selectively prepared by said translator means to indicate the information to be punched on a card, and sequence means operative in different positions to transfer the different sets of information stored on said register to said translator means in a given sequence; the combination of gating means including switching means operative as conductive to complete the prepared circuits for said punch control means, a potential storage device, a discharge circuit for said storage device including said switching means, means cyclically operative to complete said discharge circuit and thereby effect conductivity of said switching means, a charging circuit for said potential storage device completed with interruption of said discharge circuit and only in response to translation of a set of information by said translator devices, and signal means controlled by each completion of said charging circuit to generate a control signal to advance said sequence means to a different position.

4. A circuit as set forth in claim 3 which includes means in said sequence means operative to transmit a signal back to said signal means to terminate generation of said control signal.

5. In a control circuit for controlling conversion of information recorded on tape in a first code to information represented in a second code by punches on a card, register means connected to store different sets of information received from said tape, translator means for converting information in the first code to information in the second including a plurality of switching members, punch control means including digit representative circuits selectively prepared by said translator means to indicate the information to be punched on a card, sequence means operative to transfer the different sets of information stored on said register to said translator means in a predetermined sequence, gating means including means operative to periodically complete the digit representative circuits prepared by the translator means, and indication means for detecting the operation of more than two of said switching members at any time including a transformer having a core of a square hystersis loop material, a first primary winding connected between said translator means and said gating means, a second primary winding connected to a biasing potential, and a secondary winding connected to an indicator circuit, said bias potential being of a value to effect pulsing of said indicator circuit by said transformer responsive to completion of a circuit for more than two of said switching members at the same time.

6. In a control circuit for controlling conversion of information recorded on tape in a first code to information represented in a second code by punches on a card, register means connected to store different sets of information received from said tape, translator means for converting information in the first code to information in the second code, punch control means selectively prepared by said translator means to indicate the information to be punched on a card, sequence means operative to transfer the different sets of information stored on said register means to said translator means in a predetermined sequence, gating means including switching means operative to prepare said punch control means for operation in the punching of the card to include the information on said translator means, and cyclically operative means in said punch control means including a first cam means operative in each cycle to prepare said switching means for operation, and a second cam means operative thereafter to operate the prepared punch means, and means in said gating means including a timing capacitor operative to limit the time for energization of said switching means to a small fractional portion of the effective time of said first cam means.

7. For use in a control circuit for controlling conversion of information recorded on a register in a first code to information in a second code, the combination of sequence means including an input circuit, and a plurality of switching members connected to operate in a given sequence with the receipt of successive signals over said input circuit, a sequence advancing circuit including a switching device for generating a sequence advancing signal as energized, control means for selectively energizing said switching device, a control conductor connected to couple sequence advancing signals from said switching device to said input circuit for said sequence means, means for each switching member in said sequence means operative, as energized, to couple a signal over said control conductor to terminate energization of said switching device, a control switch in said sequence advancing circuit for connecting holding ground to each of said switching members as energized, and means controlled only with the release of each switching member in said sequence advancing circuit to connect said control conductor to said control switch to restore same, and thereby release the sequence advancing circuit.

8. For use in a control circuit for controlling conversion of information from a first code to a second code, sequence means including an input circuit, and a plurality of switching members connected to operate in a given sequence with the receipt of switching signals over said input circuit, a gating circuit including switching means for providing switching signals comprising a silicon controlled rectifier having a control path and a main path, means for coupling signals over said control path to energize said rectifier, means operatively controlled by said energized rectifier to provide a switching signal, and coupling means for transmitting said signal to said input circuit for said sequence means, a control switch in said sequence means for providing holding potential for each switching member in said sequence means as energized, and means for each of said switching members operative with advancement of the sequence means by a switching signal to couple said holding potential for the newly energized switching member over said coupling means to the gating circuit to terminate the switching signal.

References Cited in the file of this patent

UNITED STATES PATENTS

| 2,375,293 | Doty | May 8, 1945 |
| 2,798,554 | Smith | July 9, 1957 |
| 2,964,238 | King et al. | Dec. 13, 1960 |